United States Patent [19]

Hanada et al.

[11] Patent Number: 5,621,042
[45] Date of Patent: Apr. 15, 1997

[54] COATING COMPOSITIONS

[75] Inventors: Kazuyuki Hanada; Setsuo Hirose; Katsumi Kuriyama, all of Nihonbashi, Japan

[73] Assignees: Dainichiseika Color & Chemicals Mfg. Co., Ltd.; Ukima Colour & Chemicals Mfg, Co., Ltd., both of Tokyo, Japan

[21] Appl. No.: 504,689

[22] Filed: Jul. 20, 1995

Related U.S. Application Data

[63] Continuation-in-part of Ser. No. 63,050, May 19, 1993, abandoned, which is a continuation of Ser. No. 806,327, Dec. 13, 1991, abandoned.

[30] Foreign Application Priority Data

Dec. 17, 1990 [JP] Japan ..................... 2-411066
Dec. 25, 1990 [JP] Japan ..................... 2-412859
Dec. 25, 1990 [JP] Japan ..................... 2-412860

[51] Int. Cl.$^6$ ..................... C08G 18/62
[52] U.S. Cl. ..................... 525/102; 525/104
[58] Field of Search ..................... 525/100, 102, 525/104

[56] References Cited

U.S. PATENT DOCUMENTS

| 4,804,709 | 2/1989 | Takago et al. ..................... 525/102 |
| 4,837,198 | 6/1989 | Kuriyama et al. . |
| 4,853,418 | 8/1989 | Hanada et al. . |
| 4,861,667 | 8/1989 | Takayanagi ..................... 428/421 |
| 4,895,829 | 1/1990 | Hanada et al. . |
| 4,910,087 | 3/1990 | Torii et al. . |
| 4,942,212 | 7/1990 | Hanada et al. . |
| 5,045,599 | 9/1991 | Murase ..................... 525/102 |
| 5,065,295 | 11/1991 | Misaizu et al. . |
| 5,192,736 | 3/1993 | Hanada et al. . |
| 5,262,492 | 11/1993 | Hanada et al. . |
| 5,321,083 | 6/1994 | Harada et al. ..................... 525/102 |
| 5,384,365 | 1/1995 | Hanada et al. . |

FOREIGN PATENT DOCUMENTS 3-152119  6/1991  Japan ..................... 525/104

*Primary Examiner*—Ralph H. Dean
*Attorney, Agent, or Firm*—Oblon, Spivak, McClelland, Maier & Neustadt, P.C.

[57] ABSTRACT

Coating compositions are described. They contain, as a film-forming component, a fluoropolymer with a silane-coupling agent containing at least one free isocyanate group. The fluoropolymer may also have been modified with a reaction product of a polysiloxane or fluorine compound containing a reactive organic functional group with an organic polyisocyanate, which reaction product contains at least one free isocyanate group.

6 Claims, No Drawings

COATING COMPOSITIONS

This application is a Continuation-in-Part of application Ser. No. 08/063,050, filed on May 19, 1993, now abandoned, which is a continuation of application Ser. No. 07/806,327, filed Dec. 13, 1991, abandoned.

BACKGROUND OF THE INVENTION

1) Field of the Invention:

The present invention relates to coating compositions, and more specifically to water- and/or moisture-curing coating compositions capable of forming films excellent in surface properties. Particularly, this invention relates to fluoropolymer-base coating compositions.

2) Description of the Related Art:

Coating compositions have conventionally been used widely to form a film on the surfaces of various structures, buildings, articles and the like so as to prevent corrosion and deterioration of such coated items and in addition, to provide them with excellent external appearance and surface functions.

Various coating compositions have been known as such protective and decorative ones. In recent years, fluoropolymer-base coating compositions have been increasingly finding wide-spread utility as coating compositions excellent in various durabilities such as weather resistance and antifouling property.

Fluoropolymers inherently have excellent weather resistance, heat resistance, water repellency, chemical resistance, electrical properties, etc. They, however, are not soluble in general paint solvents. Accordingly, they have been used exclusively for extremely special applications.

In order to overcome these drawbacks, fluoropolymers soluble in general paint solvents have been developed each by copolymerizing a fluorine-containing monomer with a general fluorine-free monomer. Such copolymerizable resins, however, contain fluorine-free monomer moieties, thereby unavoidably reducing inherent excellent essential properties of fluoropolymers such as antifouling property, abrasion resistance, non-tacky property and lubricating property.

In addition, the above fluoropolymers can be provided with various high durabilities when they are used as a two-pack type paint with a curing agent, because they contain functional groups, which have various reactivities, introduced therein. Most of the curing agents employed now, however, are melamines or isocyanates, which require a heating unit upon curing under heating. Such curing agents are accompanied by the danger of fires and also a problem of inferior curing. They also involve a problem of pot life even in the case of cold setting.

SUMMARY OF THE INVENTION

An object of the present invention is therefore to provide a coating composition comprising a copolymer of a fluorine-containing monomer and a fluorine-free monomer, which copolymer is capable of forming films having the various inherent excellent properties of fluoropolymers in spite of the fact that it has good solubility in general paint solvent, and can be cured in one pack.

The above object can be attained by the present invention to be specifically described below. In one aspect of the present invention, there is thus provided a coating composition comprising as a film-forming component a fluoropolymer modified with a silane coupling agent containing at least one free isocyanate group.

In another aspect of the present invention, there is also provided a coating composition comprising as a film-forming component a fluoropolymer modified with a silane-coupling agent containing at least one free isocyanate group and with a reaction product between a polysiloxane compound containing one or more reactive organic functional groups and an organic polyisocyanate, said reaction product containing at least one free isocyanate group.

In a further aspect of the present invention, there is also provided a coating composition comprising as a film-forming component a fluoropolymer modified with a silane-coupling agent containing at least one free isocyanate group and with a reaction product between a fluorine compound containing one or more reactive organic functional groups and an organic polyisocyanate, said reaction product containing at least one free isocyanate group.

In the present invention, a coating composition can be provided by modifying a film-forming fluoropolymer with a specific silane coupling agent or with a reaction product between the silane coupling agent and another reactive compound. The coating composition according to the present invention can provide films capable of exhibiting excellent properties, which the fluoropolymer inherently has, such as antifouling property, abrasion resistance, non-tacky property, lubricating property and the like in spite of having good solubility in general paint solvents. Moreover, they can be cured in one pack without losing the above excellent properties.

DETAILED DESCRIPTION OF THE INVENTION

Examples of the silane coupling agents containing at least one free isocyanate group and usable in the invention may include compounds as represented by the following formula:

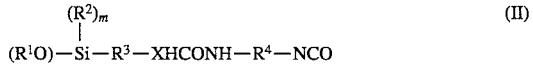

wherein $R^1$ is a lower alkyl group, $R^2$ is a lower alkyl or lower alkoxy group, $R^3$ is $C_{1-6}$ alkyl group, X is N or S, $R^4$ is an aliphatic, cycloaliphatic or aromatic residue of a polyisocyanate compound, m stands for an integer of 1–3 and n is 3- m.

Silane coupling agents of the formula (II) can be prepared by the reaction of a silane of the formula

wherein $R^1$, $R^2$, $R^3$, n and m are as above defined, and Y is a reactive functional group as defined below, with a polyisocyanate as defined below.

Preferred examples of the polysiloxane compounds containing one or more reactive organic functional groups and usable in the invention may include the following various compounds:

(1) Amino-modified polysiloxane oils:

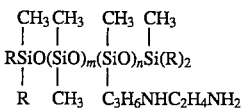

wherein m=1–10, n=2–10, and R=CH₃ or OCH₃.

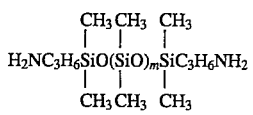

wherein m=0–200.

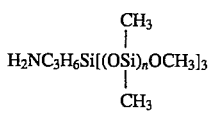

wherein n=2–10.

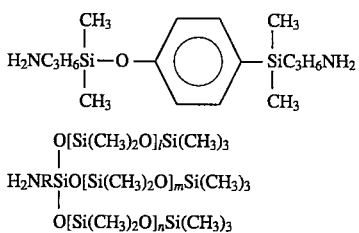

wherein branched sites=2 or 3, R=lower alkyl, l=2–200, m=2–200, and n=2–200.

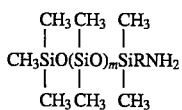

wherein m=1–200, and R=lower alkyl.

(2) Epoxy-modified siloxane oils:

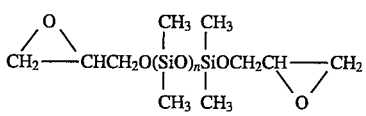

wherein n=1–200.

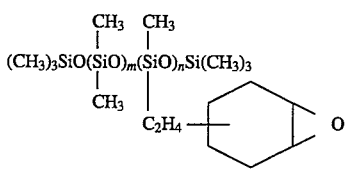

wherein m=1–10, and n=2–10.

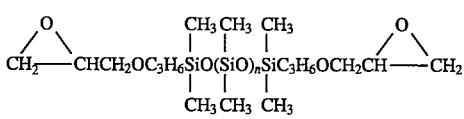

wherein n=1–200.

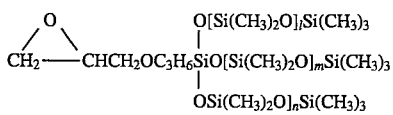

wherein branched sites=2 or 3, R=lower alkyl, l=2–200, m=2–200, and n=2–200.

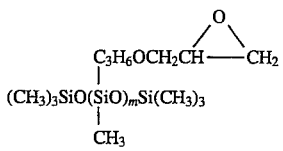

wherein m=1–10.

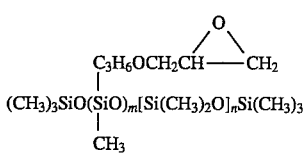

wherein m=1–10, and n=2–10.

The above epoxy compounds can be used after introducing an active hydrogen atom in at least one end thereof by reacting them with a polyol, polyamide, polycarboxylic acid or the like.

(3) Alcohol-modified siloxane oils:

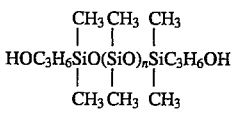

wherein n=1–200.

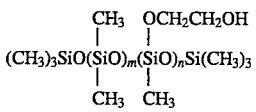

wherein m=1–10 and n=2–10.

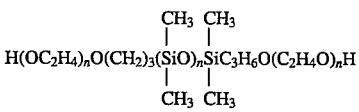

wherein n=0–200.

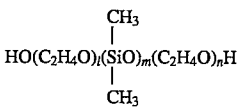

wherein l=1–10, m=10–200, and n=1–5.

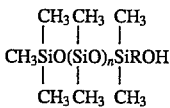

wherein n=1–200, and R=lower alkyl.

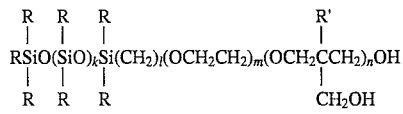

wherein R=lower alkyl, R'=hydrogen atom or alkyl group, k=1–250, l=0–5, m=0–50, and n=1–3.

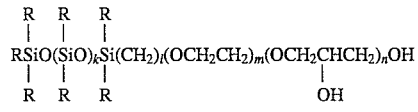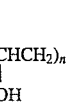

wherein R=lower alkyl, R'=hydrogen atom or alkyl group, k=1–250, l=0–5, m=0–50, and n=2–3.

(4) Mercapto-modified siloxane oils:

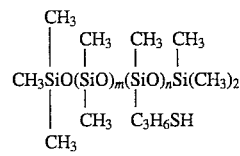

wherein m=1–10, and n=2–10.

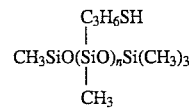

wherein n=2–10.

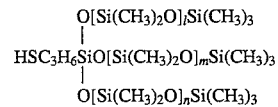

wherein branched sites: 2 or 3, R=lower alkyl, l=2–200, m=2–200, and n=2–200.

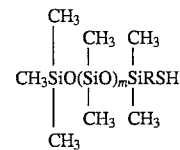

wherein n=1–200, and R=lower alkyl.

(5) Carboxyl-modified siloxane oils:

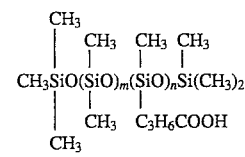

wherein m=1–10, and n=2–10.

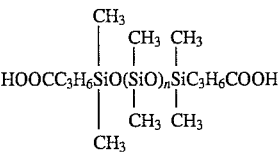

wherein n=1–200.

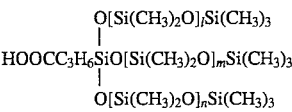

wherein branched sites: 2 or 3, R=lower alkyl, l=2–200, m=2–200, and n=2–200.

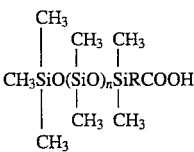

wherein n=1–200, and R=lower alkyl.

Preferred examples of the fluorine compounds containing one or more reactive organic functional groups useful in the present invention may include various compounds as represented by the following formulas:

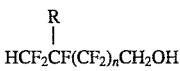

(n = 2–10)

(n = 4–13)

(n = 4–13)

(n = 4–13)

(n = 4–13)

(n = 4–13)

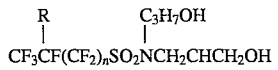

(n = 4–13)

(n = 4–13)

-continued

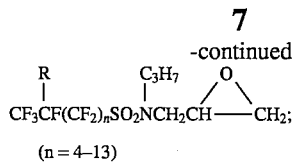

(n = 4–13)

and

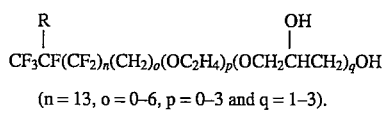

(n = 13, o = 0–6, p = 0–3 and q = 1–3).

It is to be noted that the above-listed silane coupling agents, polysiloxane compounds and fluorine compounds, each having one or more reactive organic functional groups, are merely illustrative of the compounds preferred in the invention and the invention is not necessarily limited to such exemplified compounds. The above-exemplified compounds and other known compounds which are commercially sold these days and are hence readily available on the market are all usable in the invention.

As the organic polyisocyanate to be reacted with the above silane (II), polysiloxane compound or fluorine compound in the present invention, conventionally-known polyisocyanates are all usable. Preferred examples of polyisocyanates include:

Toluene-2,4-diisocyanate,
4-Methoxy-1,3-phenylene diisocyanate,
4-Isopropyl-1,3-phenylene diisocyanate,
4-Chloro-1,3-phenylene diisocyanate,
4-Buthoxy-1,3-phenylene diisocyanate,
2,4-Diisocyanate-diphenylether,
Methylene diisocyanate,
4,4-Methylenebis(phenyl isocyanate),
Durylene diisocyanate,
1,5-Naphthalene diisocyanate,
Benzidine diisocyanate,
o-Nitrobenzidine diisocyanate,
4,4-Diisocyanate dibenzyl,
1,4-Tetramethylene diisocyanate,
1,6-Tetramethylene diisocyanate,
1,10-Decamethylene diisocyanate,
1,4-Cyclohexylene diisocyanate,
Xylylene diisocyanate,
4,4-Methylenebis(cyclohexyl isocyanate), and
1,5-Tetrahydronaphthalene diisocyanate.

Adducts of the above-described organic polyisocyanates with other compounds, for example, those represented by the following formulas can also be mentioned, although the invention is not limited to the use of these examples.

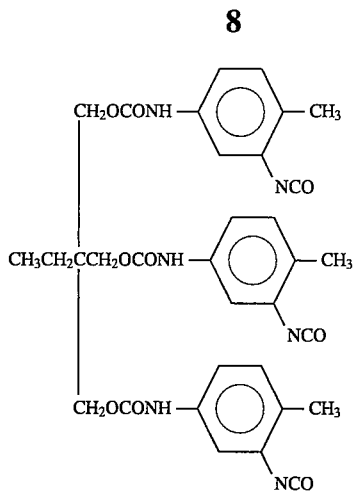

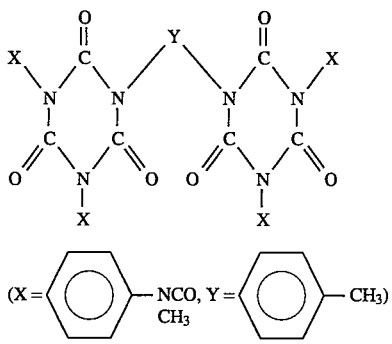

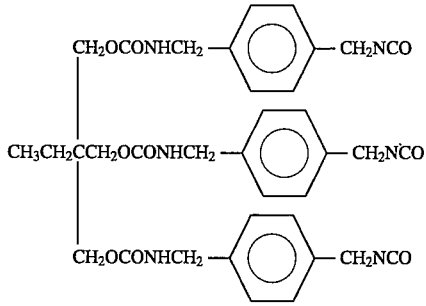

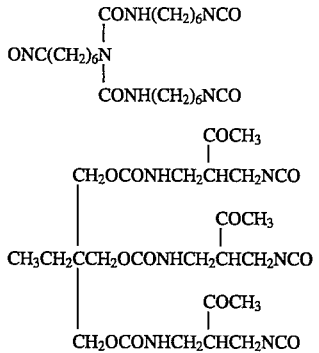

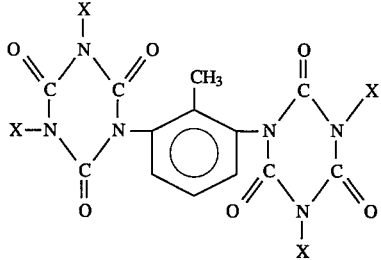

-continued

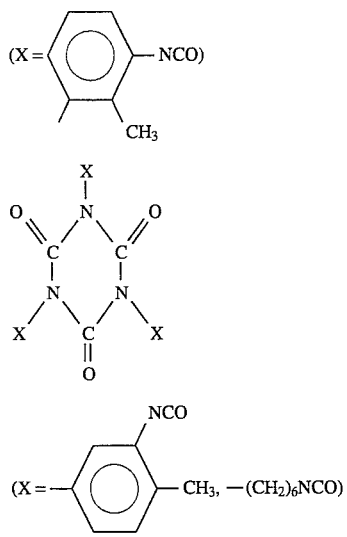

Urethane prepolymers and the like, which are obtained by reacting these organic polyisocyanates with low-molecular-weight polyols or polyamines into isocyanate-terminated polymers, can of course be used.

Reaction products useful in the present invention can each be obtained easily by reacting, in the presence or absence of an organic solvent and a catalyst at about 0°–150° C., preferably 20°–80° C. for about 10 minutes to 3 hours, a polysiloxane compound or a fluorine compound, each containing one or more reactive organic functional groups as described above, with such an organic polyisocyanate as described above at such a functional group ratio that the number of the isocyanate groups is larger by one or more, preferably one or two, compared with that of the organic functional group or groups per molecule.

These reaction products can be prepared in a solvent or without any solvent. From the process standpoint, it is advantageous to prepare them in an organic solvent because the resulting solutions can be used, as they are, for the modification of a fluoropolymer.

Any organic solvents can be used in the preparation of such reaction products as long as they are inert to the respective reactants and the reaction product.

Preferred examples of such an organic solvent include methyl ethyl ketone, methyl-n-propyl ketone, methyl isobutyl ketone, diethyl ketone, methyl formate, ethyl formate, propyl formate, methyl acetate, ethyl acetate, butyl acetate and the like. It is also feasible to use acetone, cyclohexane, tetrahydrofuran, dioxane, methanol, ethanol, isopropyl alcohol, butanol, toluene, xylene, dimethylformamide, dimethylsulfoxide, perchloroethylene, trichloroethylene, methylcellosolve, butylcellosolve, cellosolve acetate and the like.

Solvents used in general coating compositions can also be used in the present invention. Solvents exemplified above can be mentioned, for example.

As the fluoropolymer used as a film-forming resin and modified with the above silane coupling agent and a specific reaction product, various fluoropolymers have been put on the market. Any fluoropolymers available from the market can be used as long as they contain a group reactive with an isocyanate group and, in addition, is soluble in the solvent.

Examples of suitable fluoropolymers include copolymers of fluorine-containing olefin monomers, such as tetrafluoroethylene and trifluorochloroethylene, and monomers containing one or more functional groups reactive with an isocyanate group, such as hydroxyl, carboxyl, amino and epoxy groups. Typical examples of these copolymerizable monomers include various alkyl vinyl ethers.

The coating composition of the present invention contains the above-described components as essential components. They are mixed at a ratio such that the solvent is contained to give a total solid content in a range of from 5 to 50 wt. %. It is preferable to mix the film-forming fluoropolymer in a proportion of about 5–30 wt. % per 100 parts by weight of the coating composition and also to mix the silane coupling agent and the reaction product in a proportion of 1–100 parts by weight, respectively, per 100 parts by weight of the fluoropolymer. The reaction of the silane coupling agent and the reaction product with the fluoropolymer can be conducted either before or after the preparation of the coating composition. No particular limitation is imposed in this respect.

Like other general coating compositions, the coating composition of the present invention can contain one or more of extender pigments, organic pigments, inorganic pigments, other film-forming resins, plasticizers, ultraviolet absorbers, antistatic agents, leveling agents, curing agents, catalysts and the like, as needed.

As other general film-forming resins which can be used in combination, conventionally-known various film-forming resins can be mentioned. They are all usable. Examples of them include vinyl chloride resins, vinylidene chloride resins, vinyl chloride/vinyl acetate/vinyl alcohol copolymer resins, alkyd resins, epoxy resins, acrylonitrile-butadiene resins, polyurethane resins, polyurea resins, nitrocellulose resins, polybutyral resins, polyester resins, melamine resins, urea resins, acrylic resins, polyamide resins and so on. Particularly preferred are resins which have groups reactive with isocyanate groups. These resins can be used either singly or in combination and also as solutions or dispersions in an organic solvent. The coating composition of the present invention can be prepared in exactly the same manner as any conventional preparation process, and no particular limitation is imposed on it.

When the coating composition of the present invention is brought into contact with moisture in the air, water, steam or the like, the silanol groups thereof cause a crosslinking reaction, leading to the curing of the composition.

Preferred examples of the catalyst used for the acceleration of the above silanol condensation include carboxylates such as alkyl titanates, tin octylate, and dibutyltin dilaurate; amine salts such as dibutylamin-2-ethylhexoate; and other acidic and basic catalysts. It is preferable to add the catalyst in a proportion of about 0.0001–5 wt. %. The coating compositions of the present invention can be cured by combined use, as a curing agent, of an isocyanate or a melamine.

The content of silanol groups after the modification is preferably within a range of from 0.1 wt. % to 60 wt. % and more preferably within a range of 0.1–30 wt. % in view of the clearness of the paint.

The coating composition of the present invention can be cured in one pack by bringing it into contact with the moisture in the air, water, steam or the like. In addition, it can provide a coating base comparable to that obtained by curing a fluoropolymer with a curing agent such as a melamine, an isocyanate or the like in the inherent properties of a fluoropolymer paint such as surface hardness, gloss, weatherability, solvent resistance and antifouling property, The coating compositions of the present invention are useful, by themselves or in combination with a primer, not only for the coating of metallic materials such as steel plates, aluminium plates and aluminium sashes, but also for inorganic materials such as glass, cement and concrete, plastic materials such as FRP, polyesters, polyethylene, polypropylene, nylon, polyvinyl chloride resins and acrylic resins, and lumbers.

The present invention will hereinafter be described more specifically by the following examples and comparative examples, in which all designations of "part or parts" and "%" are on a weight basis unless otherwise specifically indicated.

EXAMPLES OF FIRST EMBODIMENT

Referential Example 1 (Modification of resin)

To 300 parts of a fluoroolefin-vinyl ether copolymer resin solution ("Lumiflon", trade mark; product of Asahi Glass Co., Ltd.; solid content: 50%; hydroxyl number: 24 mg-KOH/g), 21 parts of an isocyanate-containing silane coupling agent [$(CH_2O)_3Si(CH_2)_3NCO$; "KBE-9007", trade name; product of Shin-Etsu Chemical Co., Ltd.] were added and reacted at 80° C. for 7 hours, whereby a solution of a fluoropolymer modified with the above coupling agent was obtained.

In an infrared absorption spectrum of the resultant modified resin, an absorption band based on —Si—O— groups was observed at 1,090 cm$^{-1}$ but no absorption by isocyanate groups was recognized at 2,270 cm$^{-1}$.

This appears to indicate that the coupling agent was grafted on the resin.

Referential Example 2 (Modification of resin)

To 300 parts of a fluoroolefin-vinyl ether copolymer resin solution ("Lumiflon" trade mark; product of Asahi Glass Co., Ltd.; solid content: 60%; hydroxyl number: 32 mg-KOH/g), 27 parts of an isocyanate-containing silane coupling agent [$(C_2H_5O)_3Si(CH_2)_3NCO$; "KBE-9007", trade name; product of Shin-Etsu Chemical Co., Ltd.] were added and reacted at 80° C. for 7 hours, whereby a solution of a fluoropolymer modified with the above coupling agent was obtained.

In an infrared absorption spectrum of the resultant modified resin, an absorption band based on —Si—O— groups was observed at 1,090 cm$^{-1}$ but no absorption by isocyanate groups was recognized at 2270 cm$^{-1}$.

This appears to indicate that the coupling agent was grafted on the resin.

Referential Example 3 (Modification of resin)

To 300 parts of a trifluorochloroethylene copolymer resin solution ("Selflucoat", trade mark; product of Central Glass Co., Ltd.; solid content: 50%; hydroxyl number: 25 mg-KOH/g), 20 parts of an isocyanate-containing silane coupling agent [$(CH_3O)_2CH_3Si(CH_2)_3NCO$; "KBE-9007", trade name; product of Shin-Etsu Chemical Co., Ltd.] were added and reacted at 80° C. for 7 hours, whereby a solution of a fluoropolymer modified with the above coupling agent was obtained.

In an infrared absorption spectrum of the resultant modified resin, an absorption band based on —Si—O— groups was observed at 1,090 cm$^{-1}$ but no absorption by isocyanate groups was recognized at 2,270 cm$^{-1}$.

This appears to indicate that the coupling agent was grafted on the resin.

Examples 1–3 and Comparative Examples 1–3

Based on a conventional method for the preparation of coating formulations, the modified fluoropolymer solutions obtained in Referential Examples 1–3 were separately prepared into coating formulations of Examples 1–3 in accordance with their corresponding compositions shown in Table 1. Various properties of the coating formulations thus obtained were tested. The results are shown in Table 2.

The coating compositions of Comparative Examples 1–3 were prepared respectively from the unmodified fluoropolymer solutions of Referential Examples 1–3 as film-forming resins and an isocyanate as a curing agent.

Each of the thus-obtained coating formulations according to this invention was coated on a zinc-coated steel plate (phosphated) to give a dry coat thickness of 25 μm, followed by drying at room temperature of 23° C. and humidity of 46% for 10 days to form a film. Various properties of each film were measured by the following tests.

Antifouling properties (*1):

Lipstick and Crayon: Wiped off by a dry cloth.

Quick-drying felt pen:

1): Wiped off by a dry cloth.

2): Wiped off with a 50:50 (weight ratio) mixed solvent of petroleum benzine and ethanol.

| <Standard for judgment> | | |
|---|---|---|
| Resistance to lipstick | Resistance to crayon | Resistance to quick-drying felt pen |
| A: No stains were left. | " | " |
| B: Slight stains were left. | " | " |
| C: Substantial stains were left and they could not be removed easily. | " | " |
| D: Clear stains were left. | " | " |

Surface properties (*2):

Water repellency: Contact angle (°)

Falling angle (°): Angle at which a water droplet began to slip down when a coated sample was progressively tilted. (For the measurement of contact angles and falling angles, a contact angle gauge manufactured by Kyowa Kaimen Kagaku Co., Ltd. was used.)

TABLE 1

(Compositions of Coating Formulations)

| | Examples | | | Comparative Examples | | |
|---|---|---|---|---|---|---|
| | 1 | 2 | 3 | 1 | 2 | 3 |
| Resin (solid content: 50%) | 100 | 100 | 100 | 100 | 100 | 100 |
| Methyl ethyl ketone | 75 | 75 | 75 | 75 | 75 | 75 |
| Xylene | 25 | 25 | 25 | 25 | 25 | 25 |
| Titanium oxide (CR-09) | 20 | 20 | 20 | 20 | 20 | 20 |
| Colonate EH (Nippon Polyurethane Industry Co., Ltd.) | — | — | — | 8.6 | 9.3 | 9.0 |
| Dibutyltin dilaurate (*) | 0.001 | 0.001 | 0.001 | 0.0004 | 0.0004 | 0.0004 |

Dibutyltin dilaurate (*): Dibutyltin dilaurate was prepared to finally give the same amount in view of the amount added upon preparation of each reaction product.

TABLE 2

| | (Physical Properties of Films) | | | | | |
|---|---|---|---|---|---|---|
| | Examples | | | Comparative Examples | | |
| | 1 | 2 | 3 | 1 | 2 | 3 |
| Gloss (60° gloss) | 76 | 78 | 75 | 79 | 81 | 78 |
| Adhesion (Crosshatching peeling by adhesive cellophane tape) | 100/100 | 100/100 | 100/100 | 100/100 | 100/100 | 100/100 |
| Antifouling properties (*1) | | | | | | |
| Lipstick | A | A | A | A | A | A |
| Crayon | A | A | A | A | A | A |
| Quick-drying felt pen[1)] | D | D | D | D | D | D |
| Quick-drying felt pen[2)] | A | A | A | A | A | A |
| Surface properties (*2) | | | | | | |
| Water repellency | 82.6 | 84.0 | 81.8 | 78.0 | 80.2 | 77.8 |
| Falling angle | 40–50 | 40–50 | 40–50 | 40–50 | 40–50 | 40–50 |
| Coefficient of static friction | 0.40 | 0.38 | 0.38 | 0.44 | 0.41 | 0.39 |

EXAMPLES OF SECOND EMBODIMENT

Referential Example 1 (Preparation of reaction product):

While a mixture of 15.1 parts of isophorone diisocyanate, 0,005 part of dibutyltin dilaurate and 70 parts of ethyl acetate was stirred thoroughly at 80° C., 150 parts of hydroxyl-terminated polydimethylsiloxane (molecular weight: 2,200) having the following structure:

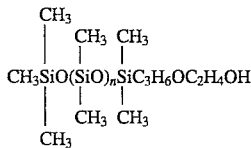

(wherein n is a value to give a molecular weight of 2,200) were gradually added dropwise, followed by reaction.

After the reaction was completed, ethyl acetate was removed by evaporation, whereby 162 parts of the reaction product (I) were obtained in the form of a clear liquid.

In an infrared absorption spectrum of the reaction product (I), an absorption by free isocyanate groups was observed at 2,270 cm$^{-1}$ and an absorption band based on —SiO— groups was also observed at 1,090 cm$^{-1}$. As a result of a quantitative analysis of free isocyanate groups in the reaction product, their content was found to be 1.61% while the theoretical value is 1.73%.

Accordingly, the principal structure of the above reaction product is presumed to have the following formula:

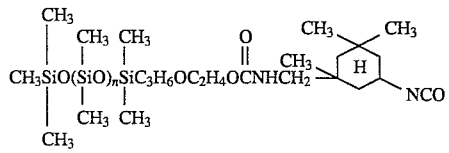

Referential Example 2 (Preparation of reaction product):

While a mixture of 121.4 parts of hydrogenated MDI, 0.006 part of butyltin dilaurate and 86 parts of ethyl acetate was stirred thoroughly at 80° C., 180 parts of hydroxyl-terminated polydimethylsiloxane (molecular weight: 2,200) having the same structure as that used in Referential Example I were gradually added dropwise, followed by reaction.

After the reaction was completed, ethyl acetate was removed by evaporation, whereby 194 parts of the reaction product (II) were obtained in the form of a clear liquid.

In an infrared absorption spectrum of the reaction product (II), an absorption by free isocyanate groups was observed at 2,270 cm$^{-1}$ and an absorption band based on —SiO— groups was also observed at 1,090 cm$^{-1}$. As a result of a quantitative analysis of free isocyanate groups in the reaction product, their content was found to be 1.58% while the theoretical value is 1.70%.

Accordingly, the principal structure of the above reaction product is presumed to have the following formula:

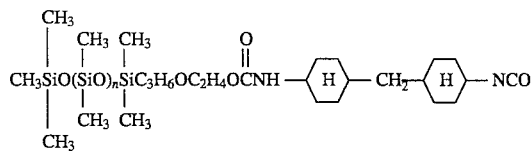

Referential Example 3 (Modification of resin):

To 300 parts of a fluoroolefin-vinyl ether copolymer resin solution ("Lumiflon", trade mark; product of Asahi Glass Co., Ltd.; solid content: 50%; hydroxyl number: 24 mg-KOH/g), 20 parts of an isocyanate-containing silane coupling agent [(CH$_{3}$O)$_3$Si(CH$_2$)$_3$NCO; "KBE-9007, trade name; product of Shin-Etsu Chemical Co., Ltd.] and 3 parts of the reaction product (I) of Referential Example 1 were added and reacted at 80° C. for 7 hours, whereby a solution of a fluoropolymer modified with the above reaction product was obtained.

In an infrared absorption spectrum of the resultant modified resin, an absorption band based on —SiO— groups was observed at 1,090 cm$^{-1}$ but no absorption by isocyanate groups was recognized at 2,270 cm$^{-1}$.

This appears to indicate that the coupling agent was grafted on the resin.

Referential Example 4 (Modification of resin):

To 300 parts of a fluoroolefin-vinyl ether copolymer resin solution ("Lumiflon", trade mark; product of Asahi Glass Co., Ltd.; solid content: 60%; hydroxyl number: 32 mg-KOH/g), 24 parts of an isocyanate-containing silane coupling agent [(C$_2$H$_5$O)$_3$Si(CH$_2$)$_3$NCO; "KBE-9007, trade name; product of Shin-Etsu Chemical Co., Ltd.] and 4 parts of the reaction product (I) of Referential Example 1 were added and reacted at 80° C. for 7 hours, whereby a solution of a fluoropolymer modified with the above reaction product was obtained.

In an infrared absorption spectrum of the resultant modified resin, an absorption band based on —SiO— groups was observed at 1,090 cm$^{-1}$ but no absorption by isocyanate groups was recognized at 2,270 cm$^{-1}$.

This appears to indicate that the coupling agent was grafted on the resin.

Referential Example 5 (Modification of resin):

To 300 parts of a trifluorochloroethylene copolymer resin solution ("Selfulcoat", trade mark; product of Central Glass Co., Ltd.; solid content: 50%; hydroxyl number: 25 mg-KOH/g), 18 parts of an isocyanate-containing silane coupling agent [(CH$_3$O)$_3$CH$_3$Si(CH$_2$)$_3$NCO; "KBE-9007, trade name; product of Shin-Etsu Chemical Co., Ltd.] and 4 parts of the reaction product (I) of Referential Example 1 were added and reacted at 80° C. for 7 hours, whereby a solution of a fluoropolymer modified with the above reaction product was obtained.

In an infrared absorption spectrum of the resultant modified resin, an absorption band based on —SiO— groups was observed at 1,090 cm$^{-1}$ but no absorption by isocyanate groups was recognized at 2,270 cm$^{-1}$.

This appears to indicate that the coupling agent was grafted on the resin.

Examples 1–3 and Comparative Examples 1–3

Based on a conventional method for the preparation of coating formulations, the modified resin solutions obtained in Referential Examples 3–5 were separately prepared into coating formulations Examples 1–3 in accordance with their corresponding compositions shown in Table 1. Tests on the physical properties of each formulation were conducted. The results are shown in Table 2.

In Comparative Examples 1–3, coating formulations were prepared respectively from the unmodified fluoropolymer solutions of Referential Examples 3–5 as film forming components and an isocyanate as a curing agent, respectively.

Each of the coating formulations thus obtained was coated on a zinc-coated steel plate (phosphated) to give a dry coat thickness of 25 μm, followed by drying at room temperature of 23° C. and humidity of 46% for 10 days to form a film. Various physical properties of each film were measured by the following tests.

Antifouling properties (*1):
Lipstick and Crayon: Wiped off by a dry cloth.
Quick-drying felt pen:

1): Wiped off by a dry cloth.
2): Wiped off with a 50:50 (weight ratio) mixed solvent of petroleum benzine and ethanol.

<Standard for judgment>

| Resistance to lipstick | Resistance to crayon | Resistance to quick-drying felt pen |
|---|---|---|
| A: No stains were left. | " | " |
| B: Slight stains were left. | " | " |
| C: Substantial stains were left and they could not be removed easily. | " | " |
| D: Clear stains were left. | " | " |

Surface properties (*2):

Water repellency: Contact angle (°)

Falling angle (°): Angle at which a water droplet began to slip down when a coated sample was progressively tilted. (For the measurement of contact angles and falling angles, a contact angle gauge manufactured by Kyowa Kaimen Kagaku Co., Ltd. was used.)

Separation by cellophane tape: JIS C 2107 was followed. Peeling force (g/m$^2$) required to remove a cellophane tape (product of Nichiban Co., Ltd.) applied under a determined pressure was measured upon an elapsed time of 3 days at 25° C.

TABLE 1

(Compositions of Coating Formulations)

| | Examples | | | Comparative Examples | | |
|---|---|---|---|---|---|---|
| | 1 | 2 | 3 | 1 | 2 | 3 |
| Resin (solid content: 50%) | 100 | 100 | 100 | 100 | 100 | 100 |
| Methyl ethyl ketone | 75 | 75 | 75 | 75 | 75 | 75 |
| Xylene | 25 | 25 | 25 | 25 | 25 | 25 |
| Titanium oxide (CR-09) | 20 | 20 | 20 | 20 | 20 | 20 |
| Colonate EH (Nippon Polyurethane Industry Co., Ltd.) | — | — | — | 8.6 | 9.3 | 9.0 |
| Dibutyltin dilaurate (*) | 0.001 | 0.001 | 0.001 | 0.0004 | 0.0004 | 0.0004 |

Dibutyltin dilaurate (*): Dibutyltin dilaurate was prepared to finally give the same amount in view of the amount added upon preparation of each reaction product.

TABLE 2

(Physical Properties of Films)

| | Examples | | | Comparative Examples | | |
|---|---|---|---|---|---|---|
| | 1 | 2 | 3 | 1 | 2 | 3 |
| Gloss (60° gloss) | 76 | 78 | 75 | 79 | 81 | 78 |
| Adhesion (Crosshatching peeling by adhesive cellophane tape) | 100/100 | 100/100 | 100/100 | 100/100 | 100/100 | 100/100 |
| Antifouling properties (*1) | | | | | | |
| Lipstick | A | A | A | A | A | A |
| Crayon | A | A | A | A | A | A |
| Quick-drying felt pen[1] | A | A | A | D | D | D |
| Quick-drying felt pen[2] | A | A | A | A | A | A |

TABLE 2-continued (Physical Properties of Films)

| | Examples | | | Comparative Examples | | |
|---|---|---|---|---|---|---|
| | 1 | 2 | 3 | 1 | 2 | 3 |
| Surface properties (*2) | | | | | | |
| Water repellency | 97.6 | 96.5 | 98.0 | 78.0 | 80.2 | 77.8 |
| Falling angle | 20–40 | 20–40 | 20–40 | 40–50 | 40–50 | 40–50 |
| Coefficient of static friction | 0.12 | 0.14 | 0.16 | 0.44 | 0.41 | 0.39 |
| Separation by cellophane tape | 19 | 14 | 18 | 285 | 306 | 322 |

EXAMPLES OF THIRD EMBODIMENT

Referential Example 1 (Preparation of reaction product):

While 71 parts of isophorone diisocyanate, 0.006 part of dibutyltin dilaurate and 221 parts of ethyl acetate were stirred thoroughly at 80° C., 150 parts of fluorine alcohol having the following structure:

were gradually added dropwise and reacted.

After the reaction was completed, ethyl acetate was removed by evaporation, whereby 214 parts of a reaction product (I) were obtained in the form of a milky white wax.

In an infrared absorption spectrum of the reaction product (I), an absorption by free isocyanate groups was observed at 2,270 cm$^{-1}$ and an absorption band based on —CF$_2$— groups was also observed at 1,190 cm$^{-1}$. As a result of a quantitative analysis of free isocyanate groups in the reaction product, their content was found to be 5.80% while the theoretical value is 6.12%.

Accordingly, the principal structure of the above reaction product is presumed to have the following formula:

Referential Example 2 (Preparation of reaction product):

While 198 parts of hydrogenated MDI, 0.009 part of dibutyltin dilaurate and 318 parts of ethyl acetate were stirred thoroughly at 80° C., 220 parts of fluorine alcohol having the following structure:

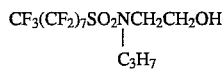

were gradually added dropwise and reacted.

After the reaction was completed, ethyl acetate was removed by evaporation, whereby 308 parts of a reaction product (II) were obtained in the form of a milky white wax.

In an infrared absorption spectrum of the reaction product (II), an absorption by free isocyanate groups was observed at 2,270 cm$^{-1}$ and an absorption band based on —CF$_2$— groups was also observed at 1,190 cm$^{-1}$. As a result of a quantitative analysis of free isocyanate groups in the reaction product, their content was found to be 4.52% while the theoretical value is 4.95%.

Accordingly, the principal structure of the above reaction product is presumed to have the following formula:

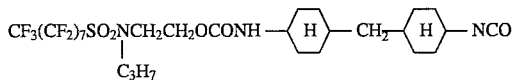

Referential Example 3 (Preparation of reaction product):

While 62 parts of hexamethylene diisocyanate, 0.008 part of dibutyltin dilaurate and 272 parts of ethyl acetate were stirred thoroughly at 80° C., 210 parts of fluorine alcohol having the following structure:

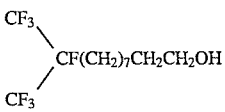

were gradually added dropwise and reacted.

After the reaction was completed, ethyl acetate was removed by evaporation, whereby 264 parts of a reaction product (III) were obtained in the form of a milky white wax.

In an infrared absorption spectrum of the reaction product (III), an absorption by free isocyanate groups was observed at 2,270 cm$^{-1}$ and an absorption band based on —CF$_2$— groups was also observed at 1,190 cm$^{-1}$. As a result of a quantitative analysis of free isocyanate groups in the reaction product, their content was found to be 5.21% while the theoretical value is 5.73%.

Accordingly, the principal structure of the above reaction product is presumed to have the following formula:

Referential Example 4 (Modification of resin):

To 300 parts of a fluoroolefin-vinyl ether copolymer resin solution ("Lumiflon", trade mark; product of Asahi Glass Co., Ltd.; solid content: 50%; hydroxyl number: 24 mg-KOH/g), 18 parts of an isocyanate-containing silane coupling agent [(CH$_3$O)$_3$Si(CH$_2$)$_3$NCO; "KBE-9007, trade name; product of Shin-Etsu Chemical Co., Ltd.] and 4 parts of the reaction product (I) of Referential Example 1 were added and reacted at 80° C. for 7 hours, whereby a solution of a fluoropolymer modified with the above reaction product was obtained.

In an infrared absorption spectrum of the resultant modified resin, no absorption by isocyanate groups was recognized at 2,270$^{-1}$.

This appears to indicate that the coupling agent was grafted on the resin.

Referential Example 5 (Modification of resin):

To 300 parts of a fluoroolefin-vinyl ether copolymer resin solution ("Lumiflon", trade mark; product of Asahi Glass Co., Ltd.; solid content: 60%; hydroxyl number: 32 mg-KOH/g), 22 parts of an isocyanate-containing silane coupling agent [$(C_2H_5O)_3Si(CH_2)_3NCO$; "KBE-9007, trade name; product of Shin-Etsu Chemical Co., Ltd.] and 4 parts of the reaction product (II) of Referential Example 2 were added and reacted at 80° C. for 7 hours, whereby a solution of a fluoropolymer modified with the above reaction product was obtained.

In an infrared absorption spectrum of the resultant modified resin, no absorption by isocyanate groups was recognized at $2,270^{-1}$.

This appears to indicate that the coupling agent was grafted on the resin.

Referential Example 6 (Modification of resin):

To 300 parts of a trifluorochloroethylene copolymer resin solution ("Selfulcoat", trade mark; product of Central Glass Co., Ltd.; solid content: 50%; hydroxyl number: 25 mg-KOH/g), 17 parts of an isocyanate-containing silane coupling agent [$(CH_3O)_3CH_3Si(CH_2)_3NCO$; "KBE-9007, trade name; product of Shin-Etsu Chemical Co., Ltd.] and 3 parts of the reaction product (III) of Referential Example 3 were added and reacted at 80° C. for 7 hours, whereby a solution of a fluoropolymer modified with the above reaction product was obtained.

In an infrared absorption spectrum of the resultant modified resin, no absorption by isocyanate groups was recognized at $2,270^{-1}$.

This appears to indicate that the coupling agent was grafted on the resin.

Examples 1–3 and Comparative Examples 1–3

Based on a conventional method for the preparation of coating formulations, the modified fluoropolymer solutions obtained in Referential Examples 4–6 were separately prepared into coating formulations of Examples 1–3 in accordance with their corresponding compositions shown in Table 1. Various properties of the coating formulations thus obtained were tested. The results are shown in Table 2.

The coating compositions of Comparative Examples 1–3 were prepared respectively from the unmodified fluoropolymer solutions used in Referential Examples 4–6 as film-forming resins and an isocyanate as a curing agent.

Each of the coating formulations thus obtained was coated on a zinc-coated steel plate (phosphated) to give a dry coat thickness of 25 μm, followed by drying at room temperature of 23° C. and humidity of 46% for 10 days to form a film. Various properties of each film were measured.

Antifouling properties (*1):

Lipstick and Crayon: Wiped off by a dry cloth.

Quick-drying felt pen:

1): Wiped off by a dry cloth.

2): Wiped off with a 50:50 mixed solvent of petroleum benzine/ethanol.

| | <Standard for judgment> | |
|---|---|---|
| Resistance to lipstick | Resistance to crayon | Resistance to quick-drying felt pen |
| A: No stains were left. | " | " |
| B: Slight stains were left. | " | " |
| C: Substantial stains were left and they could not be removed easily. | " | " |
| D: Clear stains were left. | " | " |

Surface properties (*2):

Water repellency: Contact angle (°)

Falling angle (°): Angle at which a water droplet began to slip down when a coated sample was progressively tilted. (For the measurement of contact angles and falling angles, a contact angle gauge manufactured by Kyowa Kaimen Kagaku Co., Ltd. was used.)

Separation by cellophane tape: JIS C 2107 was followed. Peeling force (g/m$^2$) required to remove a cellophane tape (product of Nichiban Co., Ltd.) applied under a determined pressure was measured upon an elapsed time of 3 days at 25° C.

TABLE 1

(Compositions of Coating Formulations)

| | Examples | | | Comparative Examples | | |
|---|---|---|---|---|---|---|
| | 1 | 2 | 3 | 1 | 2 | 3 |
| Resin (solid content: 50%) | 100 | 100 | 100 | 100 | 100 | 100 |
| Methyl ethyl ketone | 75 | 75 | 75 | 75 | 75 | 75 |
| Xylene | 25 | 25 | 25 | 25 | 25 | 25 |
| Titanium oxide (CR-09) | 20 | 20 | 20 | 20 | 20 | 20 |
| Colonate EH (Nippon Polyurethane Industry Co., Ltd.) | — | — | — | 8.6 | 9.3 | 9.0 |
| Dibutyltin dilaurate (*) | 0.001 | 0.001 | 0.001 | 0.0004 | 0.0004 | 0.0004 |

Dibutyltin dilaurate (*): Dibutyltin dilaurate was prepared to finally give the same amount in view of the amount added upon preparation of each reaction product.

TABLE 2

| | (Physical Properties of Films) | | | | | |
|---|---|---|---|---|---|---|
| | Examples | | | Comparative Examples | | |
| | 1 | 2 | 3 | 1 | 2 | 3 |
| Gloss (60° gloss) | 76 | 78 | 75 | 79 | 81 | 78 |
| Adhesion (Crosshatching peeling by adhesive cellophane tape) | 100/100 | 100/100 | 100/100 | 100/100 | 100/100 | 100/100 |
| Antifouling properties (*1) | | | | | | |
| Lipstick | A | A | A | A | A | A |
| Crayon | A | A | A | A | A | A |
| Quick-drying felt pen[1)] | B | B | B | D | D | D |
| Quick-drying felt pen[2)] | A | A | A | A | A | A |
| Surface properties (*2) | | | | | | |
| Water repellency | 107.2 | 108.0 | 104.8 | 78.0 | 80.2 | 77.8 |
| Falling angle (°) | 15–25 | 15–25 | 14–25 | 40–50 | 40–50 | 40–50 |
| Coefficient of static friction | 0.25 | 0.26 | 0.22 | 0.44 | 0.41 | 0.39 |
| Separation by cellophane tape | 45 | 41 | 52 | 285 | 306 | 322 |

Referential Example 7
(Preparation of Silicone-Type Modifier)

While thoroughly stirring at 80° C. a mixture of 15.1 parts of isophorone diisocyanate, 0.005 part of dibutyltin dilaurate and 70 parts of ethyl acetate, 150 parts of an OH-terminated polydimethylsiloxane having the below-described structure (molecular weight: 2,200) were gradually added dropwise into the mixture to conduct a reaction.

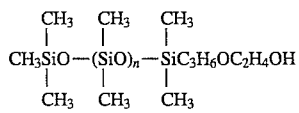

(n: a value to give the molecular weight of 2,200)

After completion of the reaction, ethyl acetate was distilled off so that 162 parts of a modifier (I) were obtained in a clear liquid form.

According to an IR spectrum of the modifier (I) so obtained, an absorption associated with free isocyanate groups was observed at 2270 cm$^{-1}$ and further, an absorption band corresponding to —Si-0- groups appeared at 1090 cm$^{-1}$.

Free isocyanate groups in the modifier were quantified to be 1.61% as opposed to 1.73% as a theoretical value.

The structure of the above modifier is believed to be represented by the following principal structure:

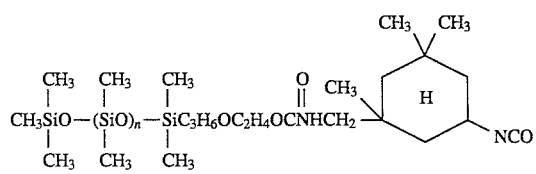

Referential Example 8
(Preparation of Silane Coupling Modifier)

While thoroughly stirring at room temperature 150 parts of a hexamethylene diisocyanate-water adduct ("DURANATE 24A-100", product of Asahi Kasei Industry Co., Ltd., NCO-23.5%), 124 parts of 3-aminopropyltriethoxysilane were gradually added dropwise into the adduct to conduct a reaction. In a colorless clear viscous liquid form, 274 parts of a modifier (II) were obtained.

According to an IR spectrum of the above modifier, an absorption associated with free isocyanate groups was observed at 2270 cm$^{-1}$ and further, an absorption band corresponding to —Si-0- groups appeared at 1090 cm$^{-1}$.

Free isocyanate groups in the modifier were quantified to be 3.92% as opposed to 4.2% as a theoretical value.

Referential Example 9
(Modification of Resin according to the Invention)

Twenty-one parts of the modifier (I) of Referential Example 7 and 68.7 parts of the modifier (II) of Referential Example 8 were added to 300 parts of a fluoroolefin-vinyl ether copolymer resin solution (solid content: 50%, hydroxyl number: 24 mgKOH/g, product of Asahi Glass Co., Ltd.), followed by a reaction at 80° C. for 8 hours so that a fluorine-containing resin modified with the modifiers was obtained.

According to an IR spectrum of the modified resin, no isocyanate groups were observed probably due to graft bonding of the modifiers on the resin.

Ninety parts of xylene were added to the modified resin, whereby a resin solution (III) having a solid content of 50% was obtained.

Referential Example 10
(Comparative Modification of Resin)

Twenty-one parts of the modifier (I) of Referential Example 7 were added to 300 parts of a fluoroolefin-vinyl ether copolymer resin solution (solid content: 50%, hydroxyl number: 24 mgKDH/g, product of Asahi Glass Co., Ltd.), followed by a reaction at 80° C. for 8 hours so that a fluorine-containing resin modified with the modifier was obtained.

According to an IR spectrum of the modified resin, no isocyanate groups were observed probably due to graft bonding of the modifier on the resin.

Twenty-one parts of xylene were added to the modified resin, whereby a resin solution (IV) having a solid content, of 50% was obtained. Coating Formulations

TABLE 3

|  |  | Ex. 1 | Comp. Ex. 1 | Comp. Ex. 2 |
|---|---|---|---|---|
| Major | Resin solution (III) | 100 | — | — |
| Component | Resin solution (IV) | — | 100 | 100 |
|  | Solvent (MEK/xylene = 8/2) | 100 | 100 | 100 |
|  | Titanium oxide | 20 | 20 | 20 |
| Catalyst[2] |  | 0.001 | 0.001 | 0.0004 |
| "CORONATE EH"[3] |  | — | — | 6 |

[1] The major components were kneaded for 24 hours in a ball mill.
[2] Dibutyltin laurate.
[3] Hexamethylene diisocyanate trimer having an isocyanurate ring structure (product of Nippon Urethane Industry Co., Ltd.).

Physical Property Tests

Zinc-coated steel plates (phosphate treated) were coated with the above coating formulations, respectively, to give a dry coat thickness of 25 μm and the resultant steel plates were allowed to stand for 10 days in the surrounding environment (23° C., 46% R.H.). Various physical properties of the coating films so formed were tested under the following conditions:

Gloss

The surface gloss of each coating film was measured in accordance with the procedures prescribed in JIS Z-8741.

Abrasion resistance

The abrasion resistance of each coating film was measured by a Taber abrader in accordance with the procedures prescribed in JIS K-7311.

| (Test conditions) | |
|---|---|
| Number of revolutions: | 70 rpm |
| Truck wheel: | CS-10 |
| Load: | 1 kg |

Chemical resistance

Each coating film was rubbed with xylene-soaked cotton. The chemical resistance of the coating film was indicated by the number of rubbing strokes required until marring was observed on the coating film.

Physical Properties of Coating Films

TABLE 4

| Coating formulation Physical property | Ex. 1 (of table 3) | Comp. Ex. 1 (of Table 3) | Comp. Ex. 2 (of Table 3) |
|---|---|---|---|
| Gloss | 81 | 61 | 65 |
| Pencil hardness | 4H | 2B | HB |
| Abrasion resistance | 1.5 mg | No film strength | 76 mg |
| Chemical resistance | ≧300 | 0 | ≦50 |

The coating film obtained from each of the coating formulations of Comparative Examples 1 and 2 had a much lower gloss compared with the gloss of the coating film formed from the coating formulation of Example 1. As a matter of fact, the resin solution (IV) had poor dispersion due to the introduction of silicone segments. As is apparent from the coating formulation of Comparative Example 1, the composition does not harden when applied as is. Even if a hardening agent (polyisocyanate) is incorporated, the resulting composition still does not undergo hardening. When the amount of the catalyst in Comparative Example 2 was increased to the same level as in Example 1, the resulting composition had an extremely short pot life subsequent to incorporation of the hardening agent so that the composition so obtained was not suited for practical Use.

It is therefore evident that the coating composition according to the invention of the subject application is superior in any of gloss, pencil hardness, abrasion resistance and chemical resistance to the comparative compositions.

Referential Example 11.

(Preparation of Silicone—Type Modifier)

While thoroughly stirring at 80° C. a mixture of 15.1 parts of isophorone diisocyanate, 0.005 part of dibutyltin dilaurate and 70 parts of ethyl acetate, 150 parts of an OH—terminated polydimethylsiloxane having the below—described structure (molecular weight: 2,200) were gradually added dropwise into the mixture to conduct a reaction.

$$CH_3SiO-(SiO)_n-SiC_3H_6OC_2H_4OH$$

(with $CH_3$ groups on each Si)

After completion of the reaction, ethyl acetate was distilled off so that 162 parts of modifier (V) were obtained in a clear liquid form.

According to an IR spectrum of the modifier (V) so obtained an absorption associated with free isocyanate groups was observed at 2270 cm$^{-1}$ and further, an absorption band corresponding to —Si-0- groups appeared at 1090 cm$^{-1}$.

Free isocyanate groups in the modifier were quantified to be 1.61% as opposed to 1.73% as a theoretical value.

The structure of the above modifier is believed to be represented by the following principal structure:

$$CH_3SiO-(SiO)_n-SiC_3H_6OC_2H_4OCNHCH_2-\text{(isophorone ring)}-NCO$$

Referential Example 12.

(Modification of Resin according to the Invention)

Twenty-one parts of the modifier (V) of Referential Example 11 and 16.0 parts of an isocyanate-containing silane coupling agent [(CH$_3$O)$_3$Si(CH$_2$)$_3$NCO; "KBE-9007", trade name; product of Shin-Etsu Chemical Co., Ltd.] were added to 300 parts of a fluoroolefin-vinyl ether copolymer resin solution (solid content: 50%, hydroxyl number: 24 mgKOH/g, product of Asahi Glass Co., Ltd.), followed by a reaction at 80° C. for 8 hours so that fluorine-containing resin modified with the modifier was obtained.

According to an IR spectrum of the modified resin, no isocyanate groups were observed probably due to graft bonding of the modifiers on the resin.

Ninety parts of xylene were added to the modified resin, whereby a resin solution (VI) having a solid content of 50 % was obtained.

Referential Example 13.

(Comparative Modification of Resin)

Twenty-one parts of the modifier (V) of Referential Example 11 were added to 300 parts of a fluoroolefin-vinyl ether copolymer resin solution (solid content: 50%, hydroxyl number: 24 mgKOH/g, product of Asahi Glass Co., Ltd.), followed by a reaction at 80° C. for 8 hours so that a fluorine-containing resin modified with the modifier was obtained.

According to an IR spectrum of the modifier resin, no isocyanate groups were observed probably due to graft bonding of the modifier on the resin.

Twenty-one parts of xylene were added to the modified resin, whereby a resin solution (VII) having a solid content of 50% was obtained.

Coating Formulations

TABLE 4

|  |  | Ex. 2 | Comp. Ex. 3 | Comp. Ex. 4 |
|---|---|---|---|---|
| Major component[1)] | Resin solution (VI) | 100 | — | — |
|  | Resin solution (VII) | — | 100 | 100 |
|  | Solvent (MEK/xylene = 8/2) | 100 | 100 | 100 |
|  | Titanium oxide | 20 | 20 | 20 |
| Catalyst[2)] |  | 0.001 | 0.001 | 0.0004 |
| "CORONATE EH"[3)] |  | — | — | 6 |

[1)]The major components were kneaded for 24 hours in a ball mill.
[2)]Dibutyltin laurate.
[3)]Hexamethylene diisocyanate trimer having an isocyanurate ring structure (product of Nippon Urethane Industry Co., Ltd.).

Physical Property Tests

Zinc-coated steel plates (phosphate treated) were coated with the above coating formulations, respectively, to give a dry coat thickness of 25 μm and the resultant steel plates were allowed to stand for 10 days in the surrounding environment (23° C., 46% R.H.). Various physical properties of the coating films so formed were tested under the following conditions:

Gloss

The surface gloss of each coating film was measured in accordance with the procedures prescribed in JIS Z - 8741.

Abrasion resistance

The abrasion resistance of each coating film was measured by a Taber abrader in accordance with the procedures prescribed in JIS K - 7311.

| (Test conditions) | |
|---|---|
| Number of revolutions: | 70 rpm |
| Truck wheel: | CS-10 |
| Load: | 1 kg |

Chemical resistance:

Each coating film was rubbed with xylene-soaked cotton. The chemical resistance of the coating film was indicated by the number of rubbing strokes required until marring was observed on the coating film.

Physical Properties of Coating Films

TABLE 5

| Coating formulation physical property | Ex. 2 (of Table 4) | Comp. Ex. 3 (of Table 4) | Comp. Ex. 4 (of Table 4) |
|---|---|---|---|
| Gloss | 77 | 61 | 65 |
| Pencil hardness | H | 2B | HB |
| Abrasion resistance | 2.1 mg | No film strength | 76 mg |
| Chemical resistance | ≧200 | 0 | ≦50 |

The coating film obtained from each of the coating formulations of Comparative Examples 3 and 4 had a much lower gloss compared with the gloss of the coating film formed from the coating formulation of Example 2. As a matter of fact, the resin solution (VII) had poor dispersion due to the introduction of silicone segments. As is apparent from the coating formulation of Comparative Example 3, the composition does not harden when applied as is. Even if a hardening agent (polyisocyanate) is incorporated, the resulting composition still does not undergo hardening. When the amount of the catalyst in Comparative Example 4 was increased to the same level as in Example 2, the resulting composition has an extremely short pot life subsequent to incorporation of the hardening agent so that the composition so obtained was not suited for practical use.

It is therefore evident that the coating composition according to the invention of the subject application is superior in any of gloss, pencil hardness, abrasion resistance and chemical resistance to the comparative composition.

We claim:

1. A coating composition comprising as a film-forming component a fluoropolymer reacted with a silane-coupling agent containing at least one free isocyanate group represented by the formula $$(R^1O)_n-\underset{\underset{(R^2)_m}{|}}{Si}-R^3-NCO \qquad (I)$$

wherein $R^1$ is a lower alkyl group, $R^2$ is a lower alkyl or lower alkoxy group, $R^3$ is $C_{1-6}$ alkyl group, m stands for an integer of 1–3 and n is 3-m, and further reacted with the reaction product between (1) a polysiloxane compound containing a reactive organic functional group selected from the group consisting of amino-, epoxy-, alcohol-, mercapto- and carboxyl-modified siloxane oils and (2) an organic polyisocyanate, said reaction product containing at least one free isocyanate group.

2. The coating composition of claim 1, wherein said reaction product is of the formula:

$$CH_3SiO-(SiO)_n-SiC_3H_6OC_2H_4OCNHCH_2-\text{(cyclohexane ring with CH}_3\text{ groups)}-NCO$$

(with CH₃ substituents on Si and cyclohexane ring)

3. The coating composition of claim 1, wherein said reaction product is of the formula:

$$CH_3SiO(SiO)_nSiC_3H_6OC_2H_4OCNH-\text{(phenyl)}-CH_2-\text{(phenyl)}-NCO$$

(with CH₃ substituents on Si)

4. A coating composition comprising as a film-forming component a fluoropolymer reacted with a silane-coupling agent containing at least one free isocyanate group represented by the formula $$(R^1O)_n-\underset{\underset{(R^2)_m}{|}}{Si}-R^3-XHCONH-NCO \qquad (II)$$

where $R^1$ is a lower alkyl group, $R^2$ is a lower alkyl group or lower alkoxy group, $R^3$ is $C_{1-6}$ alkyl group, X is N or S, $R^4$ is a residue of a polyisocyanate compound, m is an integer of 1–3 and n is 3-m, and further reacted with the reaction product between (1) a polysiloxane compound containing a reactive organic functional group selected from the group consisting of amino-, epoxy-, alcohol-, mercapto- and carboxyl-modified siloxane oils and (2) an organic polyisocyanate, said reaction product containing at least one free isocyanate group.

5. The coating composition of claim 4, wherein said reaction product is of the formula
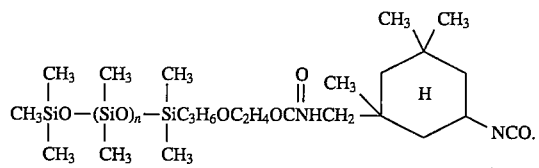
6. The coating composition of claim 4, wherein said reaction product is of the formula:
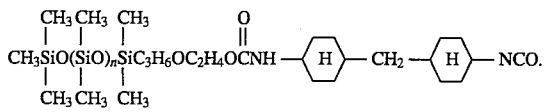
* * * * *